United States Patent
Bird (10) Patent No.: US 11,449,809 B2
(45) Date of Patent: Sep. 20, 2022

(54) APPLICATION CAPACITY FORECASTING

(71) Applicant: MASTERCARD INTERNATIONAL INCORPORATED, Purchase, NY (US)

(72) Inventor: Brett Michael Bird, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 126 days.

(21) Appl. No.: 16/945,214

(22) Filed: Jul. 31, 2020

(65) Prior Publication Data
US 2022/0036259 A1    Feb. 3, 2022

(51) Int. Cl.
G06Q 10/04    (2012.01)
G06F 11/32    (2006.01)
G06F 11/34    (2006.01)

(52) U.S. Cl.
CPC .......... *G06Q 10/04* (2013.01); *G06F 11/323* (2013.01); *G06F 11/3428* (2013.01); *G06F 2201/81* (2013.01)

(58) Field of Classification Search
CPC ... G06Q 10/04; G06F 11/323; G06F 11/3428; G06F 2201/81
USPC ......................................................... 702/186
See application file for complete search history.

(56) References Cited

U.S. PATENT DOCUMENTS

| | | |
|---|---|---|
| 7,254,750 B1 | 8/2007 | Okun et al. |
| 7,953,847 B2 * | 5/2011 | Grelewicz ............... H04L 43/16 709/227 |
| 7,996,332 B1 | 8/2011 | Saghier et al. |
| 8,015,276 B2 | 9/2011 | Hoeflin et al. |
| 8,190,939 B2 | 5/2012 | Fields, Jr. et al. |
| 8,423,344 B1 | 4/2013 | Saghier et al. |
| 8,818,840 B2 | 8/2014 | Gilpin et al. |
| 9,705,751 B1 * | 7/2017 | Yi ........................ H04L 41/0823 |
| 2017/0083914 A1 | 3/2017 | Baker et al. |
| 2021/0304102 A1 * | 9/2021 | Saraswat ............. G06F 11/3006 |

* cited by examiner

*Primary Examiner* — John H Le (57) ABSTRACT

Systems and methods forecast processing capacity by monitoring historical key performance indicators (KPIs). The KPIs include measured values relating to a number of transactions that can be processed in parallel, an average number of transactions currently being processed, and an average amount of time to process each current transaction. One or more query parameters are received to query stored KPI data corresponding to the monitored historical KPIs. A forecasted processing volume level based on predicted values determined from a predictive model of the stored KPI data. The method also comprises generating an alert in response to the processing volume level being forecast to exceed a defined threshold is generated, thereby providing more reliable capacity monitoring and prediction of problems with processing applications that may otherwise go undetected until performance impacts occur.

20 Claims, 6 Drawing Sheets

APPLICATION CAPACITY FORECASTING

BACKGROUND

System performance is affected by the processing capacity of different computing devices of the system. For example, as the processing capacity of a computing device reaches and/or exceeds a maximum, additional operations cannot be properly performed or are delayed. Tracking the maximum processing capacity, particularly for horizontally scalable, real-time processing applications, can be difficult. The volume of transactions per second (TPS) that these applications can perform can be volatile and can depend on a number of rapidly changing factors. In conventional tracking systems that use static thresholds based on performance benchmarks or other static historical data, the tracking can quickly become ineffective at predicting when an application is about to exceed one or more capacity limits. As a result, system performance is affected.

Thus, these conventional tracking systems cannot account for dynamic and rapidly changing processing demands and, as a result, may not provide satisfactory processing capacity tracking in some instances. That is, inefficient monitoring and inefficient automation of responses to system performance degradations due to exceeding capacity limits can result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for forecasting processing capacity comprises monitoring historical key performance indicators (KPIs). The KPIs include measured values relating to a number of transactions that can be processed in parallel, an average number of transactions currently being processed, and an average amount of time to process each current transaction. The method further comprises receiving one or more query parameters to query stored KPI data corresponding to the monitored historical KPIs, and obtaining a forecasted processing volume level based on predicted values determined from a predictive model of the stored KPI data. The method also comprises generating an alert in response to the processing volume level being forecast to exceed a defined threshold.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to monitor system operations and forecast future capacity using a predictive model. In various examples, a plurality of key performance indicators (KPIs) are used to predict or forecast when the TPS limit or other processing capacity limits are going to be reached or exceeded. The predictive model allows for real-time or near real-time capacity prediction or forecasting by actively performing system measurements in some examples. As a result, more robust and reliable application monitoring and capacity tracking results.

In one example, a monitoring process helps operational support understand the current capacity limits of a real-time processing application and provides advanced warning of volumes approaching a processing limit. The process provides an effective means of predicting problems with real-time or near-real-time processing applications that may otherwise go undetected until performance impacts are observed.

In some examples, the capacity limits are forecast or predicted using a combination of historical data relating to a plurality of KPIs (e.g., three KPIs in one example) and a predictive model that forecasts future volume levels. As a result, the computing devices and methods provide improved application and capacity monitoring using a predictive model that allows for processing capacity forecasting. As such, capacity limit alerts are provided in a more timely manner, thereby improving system performance. In this manner, when a processor is programmed to perform the operations described herein, the processor is used in an unconventional way, and allows for more reliable capacity monitoring, resulting in a higher level of system performance being maintained, particularly when the volume of transactions (e.g., TPS) that the applications are performing are volatile and depend on a number of rapidly changing factors.

Figure 1:
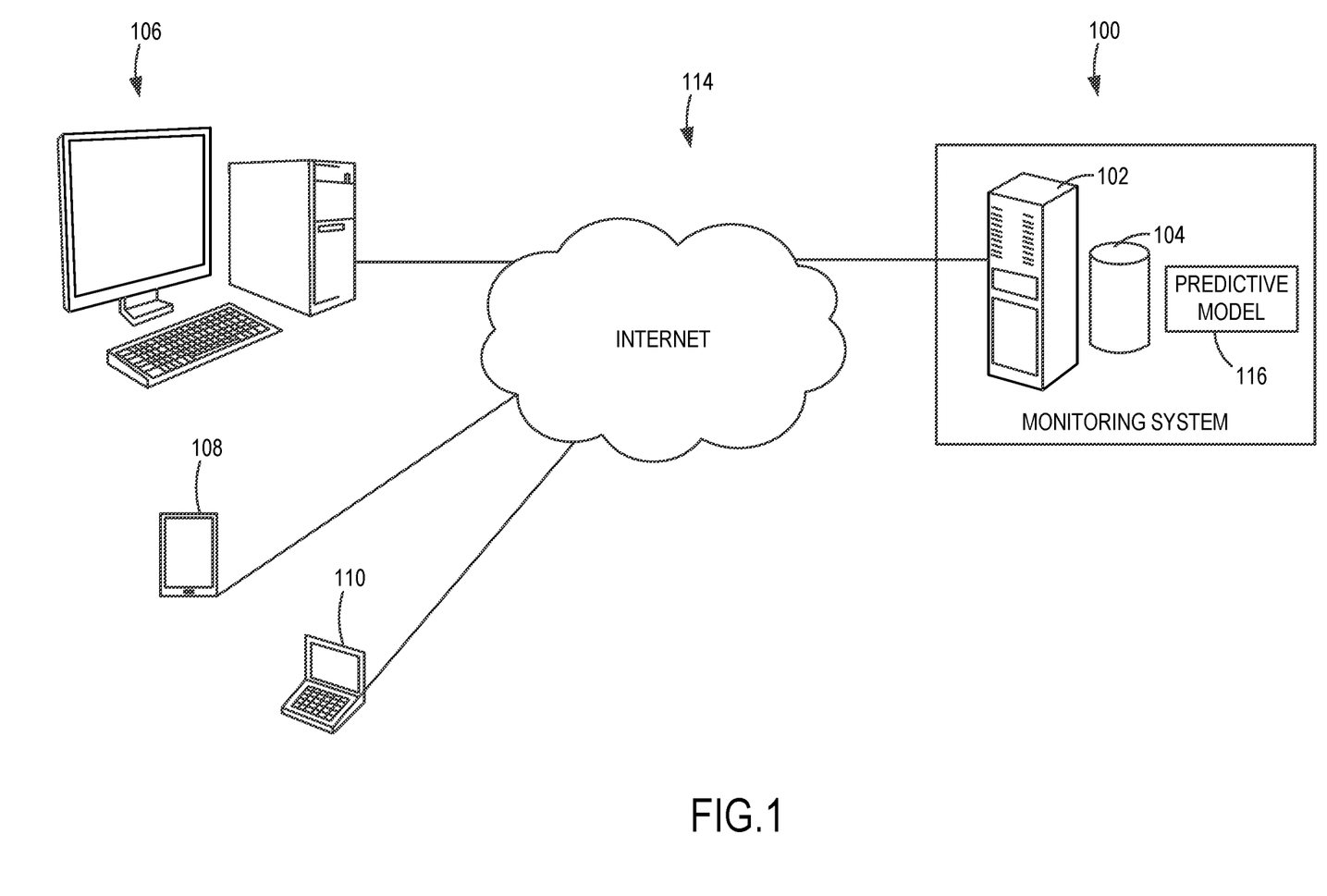
FIG. 1 is a block diagram illustrating a monitoring system according to an embodiment.

More particularly, the present disclosure configures a predictive model using active KPI measurements to forecast capacity usage, thereby allowing for improved prediction of processing capacity problems, such as when processing limits will be reached or exceeded. For example, the computing devices and methods monitor one or more real-time or near-real-time processing applications to provide a monitoring and automation process. In one example, as illustrated in FIG. 1, a schematic block diagram of a monitoring system 100 deployed as a cloud service is shown. The monitoring system 100 includes one or more computers 102 and storage 104 to store data such as monitoring data including measured system parameters related to a plurality of KPIs. In some examples, the data includes system operational data, such as operating characteristics that are actively and/or continuously measured.

The monitoring system 100 is connected to one or more end user computing devices, such as a desktop computer 106, a smart phone 108 and a laptop computer 110. For example, the monitoring system 100 is shown as connected to the end user computing devices via a computer network 114, illustrated as the Internet. The end user computing devices allow a user, in some examples, to interact with a user interface to view and/or configure different operating parameters and characteristics of a plurality of monitored applications. That is, some examples provide a monitoring utility that helps operational support individuals or teams understand the current capacity limits of a real-time processing application and provide advanced warning of volumes approaching a processing capacity limit.

In one implementation, the monitoring system 100 receives actively monitored processing data, such as related to transactions being processed by an application. For example, transaction activity (e.g., volume and processing times) is measured or sampled in real-time or near real-time and used in combination with a predictive model 116 to forecast processing levels, which are used to predict processing capacity issues (e.g., exceeding processing or capacity limits). In one example, monitoring the transaction activity includes monitoring a plurality of KPIs, such as, but not limited to:

1. The number of transactions (or requests) that an application can process in parallel (e.g., the number of active JVMs/Containers×Number of Processing threads per unit).

2. The average number of transactions/requests currently being processed by the platform per second (TPS).

3. The average amount of time each transaction/request is currently taking to be processed (in seconds).

Using the KPIs as an input to the predictive model 116 allows for more reliable system monitoring, particularly with respect to predicting capacity issues. It should be noted that the measured data corresponding to the KPIs can be captured or sampled over a defined time period, which in some examples, is continuously (or periodically) captured or sampled.

It should be noted that a "transaction" refers to any process or operation being performed, such as a discrete operation for a particular operation. In some examples, a "transaction" is a financial transaction, but can be any type of transaction, or more generally, any type of processing action.

In some examples, the monitoring system 100 is configured to use the output from the predictive model 116 to forecast processing levels for one or more different applications or processing units. As a result of the measurements being performed continuously, the present disclosure allows for a more accurate and reliable forecasting of the processing capacity, such as to more reliably identify potential future issues with reaching or exceeding a processing capacity limit.

Figure 2:
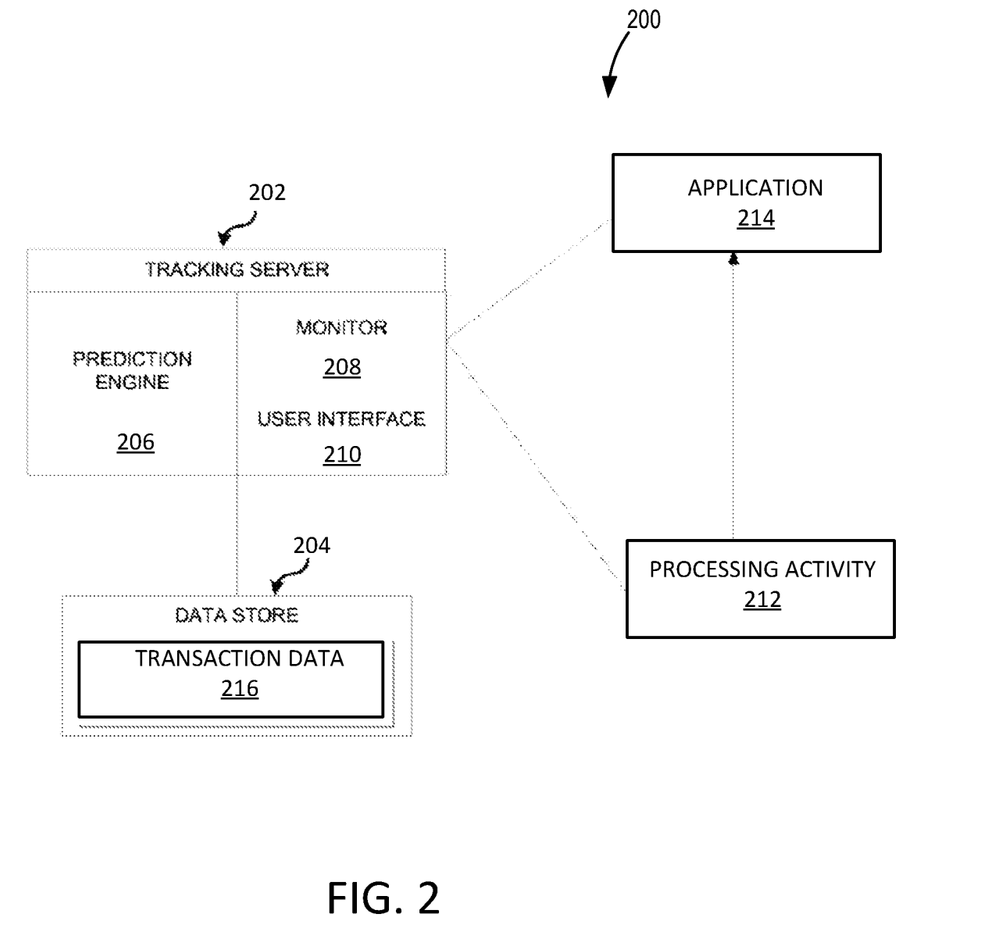
FIG. 2 is a detailed block diagram of the monitoring system of FIG. 1.

A particular implementation of a monitoring system 200 is illustrated in FIG. 2. The monitoring system 200 is configured in some examples to forecast future processing capacity as described herein. The monitoring system 200 includes a tracking server 202 and a data store 204. The tracking server 202 includes a prediction engine 206, a monitor component 208, and a user interface component 210. In some examples, the prediction engine 206 includes or shares a portion of a computer processor and non-transitory computer readable media with software embedded thereon, the software configured to execute the prediction processes for forecasting capacity described herein. For example, to predict the processing activity 212 for an application 214, the prediction engine 206 receives transaction data 216 stored in the data store 204 and uses the predictive model 116 (shown in FIG. 1) to predict future transaction activity representing a forecasted amount of transaction activity for the application 214.

It should be noted that the transaction data 216 can be acquired in any suitable way, such as using techniques in the data measurement and acquisition technology. In one example, the transaction data 216 is obtained by querying a transaction database to parse a transactional log to obtain the desired information, such as measured transaction activity related to one or more KPIs. The transaction data 216 in some examples is obtained using a Structured Query Language (SQL) command of a file or database maintained within the data store 204, which includes the transaction data 216 in some examples. The transaction data 216 in some examples is aggregated to build the predictive model 116 (shown in FIG. 1).

Other examples of acquiring the transaction data 216 include allowing an application to actively push and/or stream the metrics over a messaging system. In one example, a streaming platform such as Apache Kafka® can be used to read and/or write streams of data relating to the metrics.

It should also be noted that the monitoring and predictive aspects of the present disclosure are not limited to processing activity 212 for the application 214. That is, the present disclosure can be implemented to predict processing activity and/or forecast future activity to identify capacity issues, such as when a processing capacity is predicted to be met or exceeded.

The prediction engine 206 in some examples uses the predictive model 116 (shown in FIG. 1) having a plurality of KPIs as inputs (the KPIs relating to the processing activity 212) to calculate transaction values to forecast future activity by the application 214. That is, based on measured or recorded KPIs related to transactions (or requests), the predictive model 116 allows for forecasting future activity and possible future capacity levels that approach or exceed processing limits. For example, the transaction values related to the KPIs are actively measured (or sampled) in near real-time. In one example, the source of this information is obtained by periodically querying a database table where transactional records are written for volume and processing times. If the number of parallel processing threads are adjustable, the information is automatically updated from an appropriate source (e.g., deployed config files, database table, code repository, etc.).

In one example, the following values are calculated:

1. Estimated maximum capacity (Max TPS).
    a. Processing Threads (1)/Avg. Time in Seconds (3)=Max TPS.
    b. It is noted that if time is represented in milliseconds (ms), the TPS formula is: (1000/Avg. Time in MS)× Processing_Threads=MaxTPS.

2. Prediction model to forecast future TPS based on historical data.

3. Prediction model to forecast Max TPS (to better account for trends associated with processing time), which is optional in some examples.

It should be noted that the calculated values are correlated with one or more operating characteristics or parameters, such as correlated with the time of day or date, the application performing the transactions, the processing unit performing the transactions, etc. That is, transaction values can be aggregated for an entire day, time of day, day of the week, month, etc., as well as correlated with different characteristics.

Referring again to FIG. 2, the tracking server 202 includes the monitor component 208 configured to monitor one or more applications 214 and provide alerts, for example, when the capacity for a particular application 214 is predicted to be approached or exceeded. In some examples, the monitor component 208 includes or shares a portion of a computer processor and non-transitory computer readable media with software embedded thereon, the software configured to execute one or more tracking processes described herein. For example, the monitor component 208 actively monitors the transaction activity for the application 214.

The tracking server 202 includes the user interface component 210, which in some examples is implemented in a data management platform (e.g., a Splunk monitoring platform). The user interface component 210 in some examples includes or shares a portion of a computer processor and non-transitory computer readable media with software embedded thereon, the software configured to execute a user interface process, and to send information to a display, and accept input from a user input device. For example, the user interface component 210 is configured to display information, such as graphs or a dashboard representing aggregated capacity or transaction data, processing trends, predicted usage and percentage of capacity, etc. In one example, a graph (e.g., a line graph) shows current values, predicted values, thresholds etc. Graph features are also configured in some examples to show particular information, such as the closeness of the lines on the graph or where lines intersect. The user interface component 210 in various examples thereby provides visualization of the prediction model or forecast. One example of a user interface is described in more detail herein in connection with FIG. 7.

The user interface component 210 is further configured to display alerts relating to capacity, for example, a capacity that is predicted or forecast to be exceeded. Additionally, the user interface component 210 is configured to receive user inputs, such as to control the data being collected (e.g., frequency of transaction measurements), the type of data being displayed, the format of the data being displayed, etc. Additional user-defined parameters can include manually-entered values, such as a maximum threshold value for an alert, or other user-defined parameters.

In some examples, alert condition automation preferences are provided and include setting a threshold value at which an alert is issued relative to the difference between a maximum capacity and an approaching maximum capacity value. The alert setting in one example enables the monitor component 208 to send an alert message to the user interface component 210 to alert the user that the threshold value has been exceeded.

In some examples, the alert setting also enables the monitor component 208 to send a modification or termination signal to the application 214 to modify current or future operations (e.g., transaction processing), such that a possible exceeding of a capacity threshold is avoided. In some examples, the monitor component 208 sends an output signal to a load balancing component (not shown) to cause operations to be performed on an alternate network connectivity path, using an alternate application 214, etc. As another example, a decision is made to undo a particular change based on peak usage during the afternoon or undo a scheduled changed infrastructure occurring overnight, which is now resulting in new predicted capacity values. That is, in accordance with the present disclosure, an alert is provided with sufficient advance notice (e.g., several hours in advance of a predicted over-capacity condition) to change operations that are to be performed, such as backups, updates, etc.

In some examples, the alert setting enables the monitor component 210 to send an alert message to a user device, such as one or more end user computing devices, including the desktop computer 106, the smart phone 108 and the laptop computer 110 (shown in FIG. 1) using network transmission protocols such as SNMP, SMS, SMTP, HTTP, or other similar protocols. It should be appreciated that the user device can be any type of user device, such as in addition to the desktop computer 106, the smart phone 108 and the laptop computer 110, a tablet computer, a pager, or other devices capable of receiving electronic messages.

The user interface component 210 is configured in some examples to accept user input from a standard input device such as a touch screen, microphone and voice recognition device, keyboard, mouse, or other input device.

In some examples, the processing operations, such as all of the transactions, are routed through a decision management platform (DMP), such as in a financial transaction application. For example, the DMP can be provided as described in U.S. Patent Application Publication No. 2017/0083914. In some examples, the DMP (e.g., a relational database system) stores external customer information for external customer issuers, acquirers, and authorized third parties. In one example, the DMP includes an authentication database that stores and maintains records, files, and other data structures representative of customer data including, but not limited to, contracts, notes (e.g., messages, documents, unstructured data, etc.), certification information, credit card ranges, payment device BINS (Bank Identification Numbers), merchant information, and other data.

An authentication database user interface in some examples provides, internal to an enterprise, an interface for internal authentication users to access and otherwise communicate with the DMP. In some examples, the authentication database user interface provides a mechanism for internal authentication users to access authentication information of an authentication platform to provide or at least facilitate customer support functions and business or analyst access to external customer authentication related data (e.g., contact information, billing information, etc.). The present disclosure is implemented in some examples with such a system having the DMP.

Figure 3:
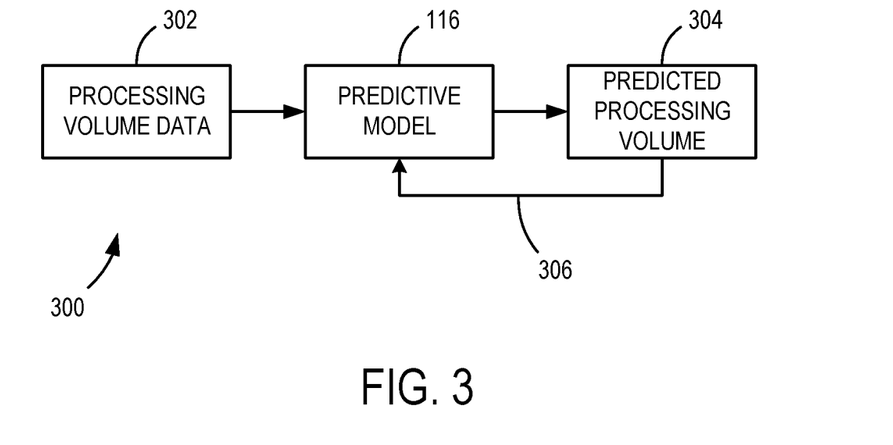
FIG. 3 is a block diagram illustrating a workflow for forecasting processing volume according to an embodiment.

With respect to a transaction example, and as shown in FIG. 3, illustrating a workflow 300 in accordance with various examples, processing volume data is accessed at 302. For example, historical transaction processing volume data that is actively and continuously monitored as described herein, and that has been saved, such as in the data store 204 (shown in FIG. 2) is sampled. In one example, the processing volume data includes transaction data from a queried transactional log relating to the number of transaction performed (and other information) that allows for determining a processing volume, and predicting a future processing volume. For example, the processing volume relates to the KPIs described herein and is used to predict future processing capacity.

The historical transaction processing volume data includes data over a certain time period, which can be updated or reset, and can be aggregated. The historical transaction processing volume data is then input to the predictive model 116 for processing. As described herein, different values for the plurality of KPIs are calculated and can be used to forecast future processing capacity. That is, the predictive model 116 performs predictive modeling using techniques in the predictive technology that uses a model to predict whether, for example, a future processing volume is expected to exceed a capacity threshold. Thus, a predicted processing volume 304 at a future point in time is forecast. By adjusting the parameters for the calculations as described herein (such as timing), the predicted processing volume 304 determination can be customized. The outputted predicted processing volume 304 can be used to generate alerts or modify processing operations as described herein.

A feedback loop 306 is used to also build the predictive model 116 in combination with continuously updating the processing volume data at 302 as described herein. In some examples, the feedback loop 306 is a feedback mechanism that analyzes the outputted data, namely the outputted predicted processing volume at 304, and adjust the parameters of the predictive model 116. The feedback loop 306 in some examples allows the predictive model 116 to thereby continuously adjust future predictions (e.g., based on which input volume, query frequency, input range, or query structure is selected).

Figure 4:
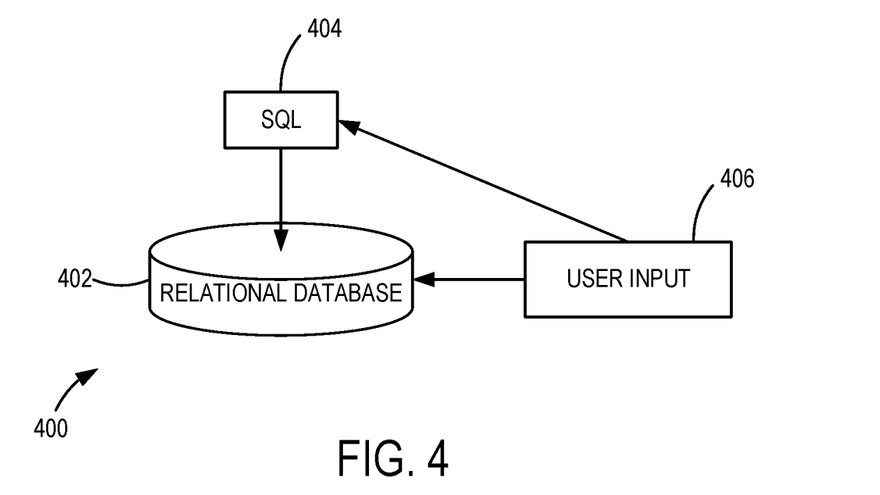
FIG. 4 is a block diagram illustrating an architecture according to an embodiment.

It should be appreciated that the different architectures and data structures can be used in accordance with the present disclosure. For example, FIG. 4 illustrates one architecture 400 that includes a relational database 402, such as a relational database comprising one or more database nodes that manage data for a business enterprise, that operates in connection with one or more utilities to process data within the relational database 402. In various examples, the relational database 402 is configured as distributed storage.

In the illustrated example, a SQL 404 is used to generate queries to obtain or sample the processing volume data 302 (shown in FIG. 3), which is based on a user input 406 in some examples. For example, the user defines the query parameters that can set, for example, the sensitivity or granularity at which data is sampled, and correspondingly, the sensitivity or granularity of alerts that are provided as described herein.

Thus, SQL commands are used to search the relational database 402 in one example. It should be noted that different SQL frameworks can be used, such as Apache Hadoop®, Apache Hive, and Apache Impala®. Moreover, different operating environments and database structures are contemplated by the present disclosure.

In operation, and as an example, the workflow 300 is used to avoid over-capacity conditions by predicting future processing volume levels. In one example, three historical KPIs are continuously monitored and processed with a predictive data model (e.g., predictive model 116) that forecasts future volume levels. As one example, and without limitation, an application has ten processing units. Each processing unit is configured with five execution threads capable of processing one transaction at a time. The platform is currently receiving and processing 500 TPS with an average processing time of 50 ms per transaction.

The workflow obtains the following KPIs:
1. The number of transactions (or requests) that an application can process in parallel (e.g., the number of active Java Virtual Machines (JVMs)/Containers×Number of Processing threads per unit)=50 Parallel Transactions (10×5).
2. The average number of transactions/requests currently being processed by the platform per second (TPS)=500 TPS.
3. The average amount of time each transaction/request is currently taking (in seconds)=50 ms (or 0.050 seconds).
The following is then calculated:
1. Max TPS=50/0.05=1,000.
2. Current TPS=500.
3. Capacity Used=50%.

It should be noted that if these values remain static, the application is performing within acceptable processing volume levels (i.e., not exceeding a maximum capacity used). However, many different factors can impact the amount of time each transaction takes to complete, including:
Available system resources (e.g., CPU, Memory, Disk I/O, etc.);
Network latency (small changes to network latency can have large impact to low latency applications);
Complexity of incoming requests (e.g., how many rules/steps are being executed);
New or modified rule execution steps (some applications support dynamically changing business rules that can be directly modified by users);
Code or infrastructure changes (e.g., quarterly code updates or OS patching); and
Current volume (incoming volume rates can also sometimes affect the processing speeds).

Some different scenarios will now be described in connection with customers. In a first scenario, a number of large customers have submitted rule changes to protect the customers from a new type of fraud attack. These changes increase the average processing time by 20 ms, which results in the following new values being obtained based on the continuously monitored processing volume:
1. The number of transactions (or requests) that an application can process in parallel=50 Parallel Transactions (10× 5).
2. The average number of transactions/requests currently being processed by the platform per second (TPS)=500 TPS.
3. The average amount of time each transaction/request is currently taking (in seconds)=70 ms (or 0.070 seconds).
The following is then calculated:
Max TPS=50/0.07=714.
Current TPS=500.
Capacity Used=70%.

In a second scenario, two of the ten processing units fail or are taken offline for maintenance. As a result, the following new values are obtained based on the continuously monitored processing volume:
1. The number of transactions (or requests) that an application can process in parallel=40 Parallel Transactions (8×5).
2. The average number of transactions/requests currently being processed by the platform per second (TPS)=500 TPS.
3. The average amount of time each transaction/request is currently taking (in seconds)=70 ms (or 0.070 seconds).
The following is then calculated:
Max TPS=40/0.07=571
Current TPS=500
Capacity Used=87%

If the capacity threshold is set at 85% for capacity used, an alert is issued in the second scenario, indicating that the application is now coming close to a maximum capacity and would be unable to "absorb" much additional impact from a network latency increase or spike in transaction volume. Conventional monitors based on a static capacity threshold cannot detect this approaching situation due to the dynamic nature of the application. With the present disclosure and using the above-determined information, an alert can be displayed in the user interface 210 (shown in FIG. 2), such as on application monitoring dashboards or an alert email can be sent to an appropriate support group in advance of the adverse condition. As should be appreciated, with historical data, such as knowing when different processing capabilities have changed (time of day, date, etc.), capacity used values can be predicted with respect to particular time periods. Moreover, with aggregated data, and for example, predictions of the likelihood of processing unit failure can be incorporated into the predictive aspect using the predictive model 116.

As should be appreciated, the continuously monitored data can be parsed based on different criteria or parameters. For example, different query parameters can be used that define the type and content of the data to be searched. For example, the query parameters define the sampled data used to predict capacity volume, which can include, an input volume (e.g., how much total data is to be obtained), a query frequency (e.g., query encompasses date over an hour, day, week, month, etc.), and query structure (e.g., sort which KPIs to monitor).

In various examples, the parallel processing is performed using a plurality of parallel processing units (e.g., a number of parallel processing units can be obtained and recorded). In one example, a monitoring component is provided on application servers that checks to see how many JVMs are currently operational, and combines that information with configuration data indicating how many processing threads each of those JVMs contain. Alternatively, in another example, some or all of the information is statically input from a user interface. Although, it should be noted that in this example, the effectiveness of the prediction logic would be reduced.

Figure 5:
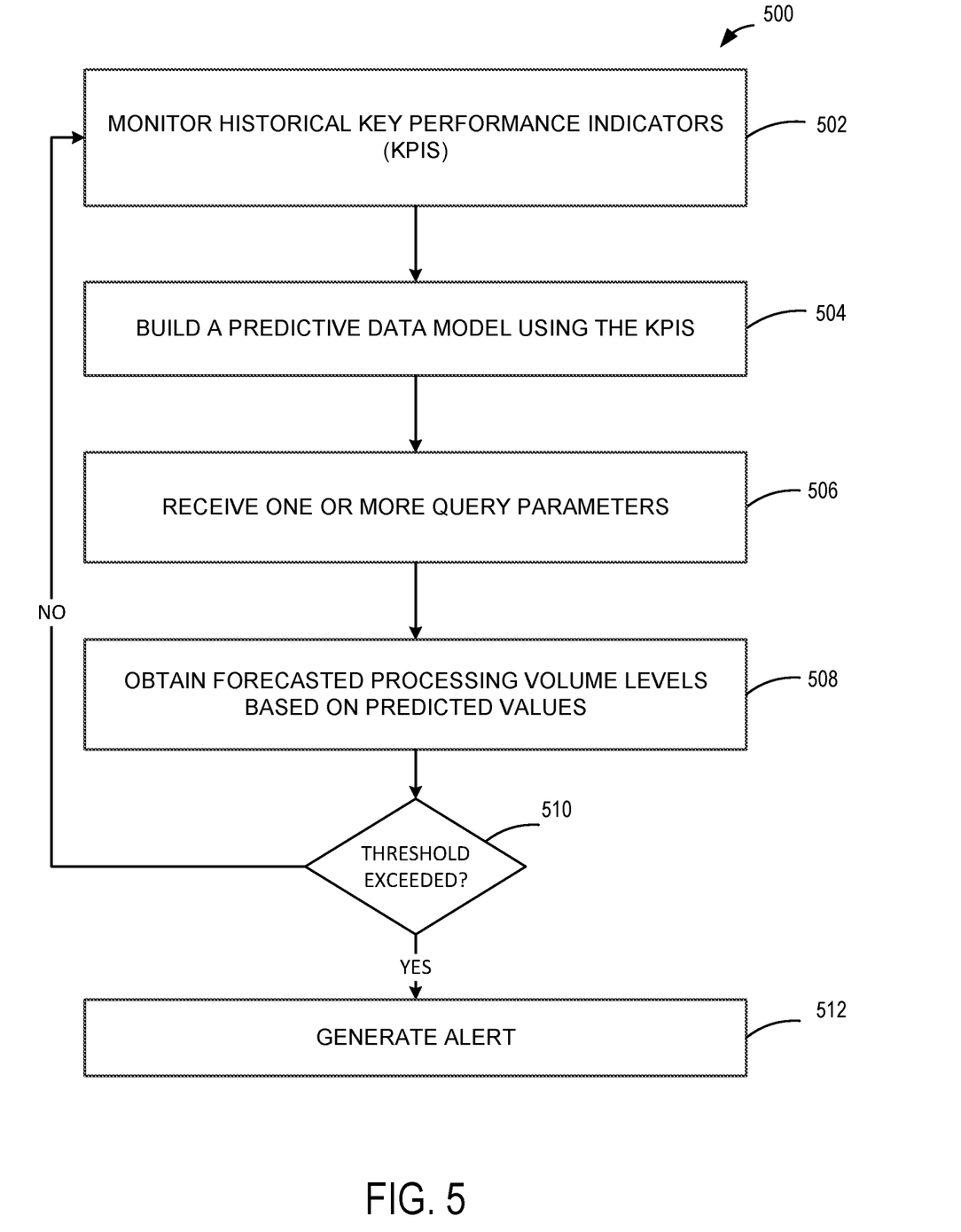
FIG. 5 is an exemplary flow chart illustrating operations of a computing device for forecasting processing capacity according to various embodiments.

FIG. 5 illustrate a flow chart of a method 500 for forecasting processing capacity. In particular, this figure is a flow chart illustrating operations of a computing device to forecast processing levels among a plurality of processing units, in some examples. The operations illustrated in the flow chart described herein can be performed in a different order than is shown, can include additional or fewer operations and can be modified as desired or needed. Additionally, one or more operations can be performed simultaneously, concurrently or sequentially.

With reference to the method 500 illustrated in FIG. 5, historical KPIs are monitored at 502. For example, as described herein, three KPIs are continuously monitored that relate to the number of transactions that can be processed, the average number of transactions currently being processed, and the average amount of time each transaction is taking to be processed. It should be noted that different or additional KPIs can be monitored. The KPI values are actively measured (or sampled) in near real-time in some examples. As should be appreciated, in various examples, the data that is monitored is associated with or accompanied by a date/time stamp. In one example, the time stamp data includes the time at which a transaction was processed.

A predictive data model is built at 504. For example, using the historical KPIs and performing the calculations described herein, as well as knowing when certain events are scheduled or likely to occur, a predictive data model is formed that allows for determining future processing capacity. In some examples, predictive modeling is performed in a process wherein the probability of an outcome (e.g., processing volume level of a plurality of processing units) is predicted using a set of predictor variables (e.g., historical KPIs and known variables relating to available processing units).

One or more query parameters are received at 506. For example, one or more query parameters (e.g., SQL query) are used to query a transactional database to parse a transactional log that represents processing activity (e.g., volume data relating to processing of transactions). The query parameters can be automatically generated based on defined or desired operating criteria or characteristics, or can be user defined or adjusted. That is, the KPIs being sampled, the frequency of sampling, the duration of the sampled period, etc. are used to define the query parameters. For example, a database table is periodically queried in some examples. The database table includes transactional records that are stored relating to volume and processing times.

With the received query parameters, forecasted processing levels are obtained at 508. In particular, using the predicted values from the predictive data model, future processing levels, such as forecasted future processing volume levels, are calculated as described herein. In one example, a forecasted capacity used for a plurality of processing units is calculated. That is, a forecasted future available processing volume is calculated.

A determination is then made at 510 whether a threshold is exceeded. For example, a processing volume level is set that is below a maximum processing level for one or more processing units. The threshold can be varied as desired or needed, for example, based on the application, type of data being processed (e.g., critical information versus non-critical information), user defined settings, etc. If the threshold is not exceeded, then the method returns to 502, wherein historical KPIs are monitored. It should be noted that the KPIs are continuously monitored.

If the threshold is exceeded as determined at 510, then an alert is generated at 512. As described herein, the alert indicates a predicted processing volume issue, such as the forecast value being predicted to closely approach or exceed the maximum processing volume capacity. In one example, this alert indicates that the available processing unit(s) will be operating at a level close to or exceeding a maximum level. The alert in one example is generated and displayed to a user, thereby allowing the user to perform preventive remedial action. In some examples, the preventive remedial action is automatically performed, such as automatically changing processing units to be used for certain operations, not performing a particular maintenance or update, etc.

It should be appreciated that the generated alert in some examples, particularly generating an alert in response to the processing volume level being forecast to exceed a defined threshold includes generating an alert based on the proximity or closeness in which the predicted volume/demand (TPS) approaches the predicted processing capacity (Max_TPS). The proximity or closeness of these two measures in various examples is the threshold being defined by the user or for which the user desires to receive the alert. In some examples, another configurable aspect of the alerting logic includes a forecasted timeframe (e.g., how far into the future to "look", such as to predict or forecast).

Thus, various examples provide information relating to current capacity limits of a real-time processing application and provide advanced warning of processing volumes approaching a maximum processing level.

EXEMPLARY OPERATING ENVIRONMENT

Figure 6:
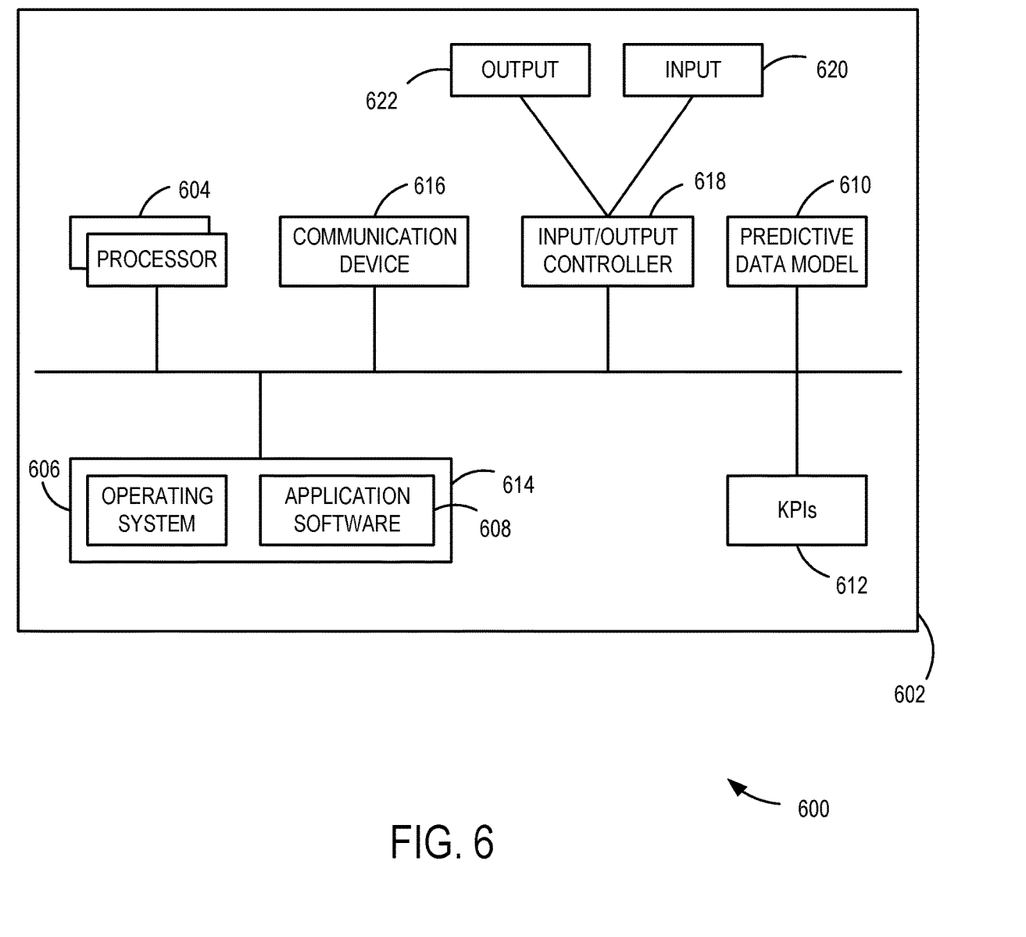
FIG. 6 illustrates a computing apparatus according to an embodiment as a functional block diagram.
Figure 7:
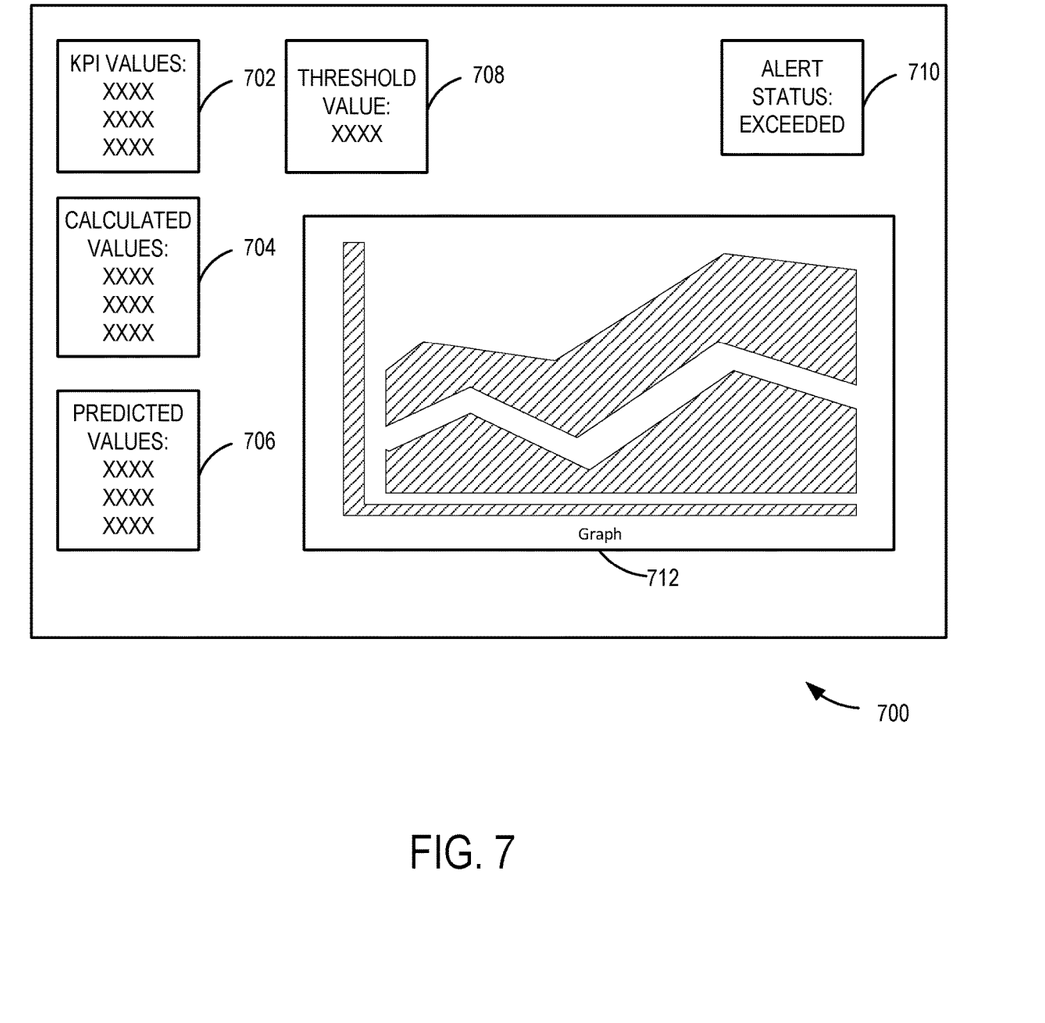
FIG. 7 illustrates a user interface according to an embodiment.

The present disclosure is operable with a computing apparatus 602 according to an embodiment as a functional block diagram 600 as illustrated in FIG. 6 and having a user interface 700 as illustrated in FIG. 7. In one example, components of the computing apparatus 602 may be implemented as a part of an electronic device according to one or more embodiments described in this specification. The computing apparatus 602 comprises one or more processors 604 which may be microprocessors, controllers or any other suitable type of processors for processing computer executable instructions to control the operation of the electronic device. Platform software comprising an operating system 606 or any other suitable platform software may be provided on the apparatus 602 to enable application software 608 to be executed on the device. According to an embodiment, prediction of processing volume levels using a predictive data model 610 processing KPIs 612, can be accomplished by software.

The user interface 700 is configured in various examples to display visualization of measured values and of a prediction or forecast model, as well as other information. In the illustrated example, the user interface displays KPI values 702, calculated values 704, and predicted values 706 relating to processing volume levels. As described herein, the KPI values 702 represent continuously monitored values, which can be sampled periodically to determine the calculated values 704. In some examples, the values are aggregated values over a defined time period. The predicted values 706 are determined from the predictive model 116 (shown in FIG. 1) and historical KPI values 702 in some examples.

As described herein, a threshold value 708 is set, which defines a threshold for an alert that is based on a maximum processing capacity, and is displayed by the user interface 700. An alert status 710 is also displayed, which indicates whether the threshold value 708 has been or is predicted to be exceed. In the illustrated example, the alert status 710 is normal, indicating that the threshold value 708 is not and is not predicted to be exceeded. If the threshold value 708 is exceeded or predicted to be exceeded, the alert status changes to indicate this condition. In some examples, this alert condition results in other notifications as described herein and optionally remedial action. In one example of the user interface 700, the alert status 710 is displayed in color (e.g., red) if the threshold value 708 is exceeded. Optionally or additionally audible or other alerts can be provided.

A graph 712 is also displayed by the user interface 700. For example, the graph 712 is a visualization of the current and forecasted processing volume levels.

Referring again to FIG. 6, computer executable instructions may be provided using any computer-readable media that are accessible by the computing apparatus 602. Computer-readable media may include, for example, computer storage media such as a memory 614 and communications media. Computer storage media, such as the memory 614, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 614) is shown within the computing apparatus 602, it will be appreciated by a person skilled in the art, that the storage may be distributed or located remotely and accessed via a network or other communication link (e.g. using a communication interface 616).

The computing apparatus 602 may comprise an input/output controller 618 configured to output information to one or more input devices 620 and output devices 622, for example a display or a speaker, which may be separate from or integral to the electronic device. The input/output controller 618 may also be configured to receive and process an input from the one or more input devices 620, for example, a keyboard, a microphone or a touchpad. In one embodiment, the output device 622 may also act as the input device 620. An example of such a device may be a touch sensitive display. The input/output controller 618 may also output data to devices other than the output device 622, e.g. a locally connected printing device. In some embodiments, a user may provide input to the input device(s) 620 and/or receive output from the output device(s) 622.

In some examples, the computing apparatus 602 detects voice input, user gestures or other user actions and provides a natural user interface (NUI). This user input may be used to author electronic ink, view content, select ink controls, play videos with electronic ink overlays and for other purposes. The input/output controller 618 outputs data to devices other than a display device in some examples, e.g. a locally connected printing device.

The functionality described herein can be performed, at least in part, by one or more hardware logic components. According to an embodiment, the computing apparatus 602 is configured by the program code when executed by the processor(s) 604 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for forecasting processing capacity, the system comprising:
  at least one processor; and
  at least one memory comprising computer program code, the at least one memory and the computer program code configured to, with the at least one processor, cause the at least one processor to:
  monitor historical key performance indicators (KPIs), the KPIs including measured values relating to a number of transactions that can be processed in parallel, an average number of transactions currently being processed, and an average amount of time to process each current transaction;
  receive one or more query parameters to query stored KPI data corresponding to the monitored historical KPIs;
  obtain a forecasted processing volume level based on predicted values determined from a predictive model of the stored KPI data; and
  generate an alert in response to the processing volume level being forecast to exceed a defined threshold.

A computerized method for forecasting processing capacity, the computerized method comprising:
  monitoring historical key performance indicators (KPIs), the KPIs including measured values relating to a number of transactions that can be processed in parallel, an average number of transactions currently being processed, and an average amount of time to process each current transaction;
  receiving one or more query parameters to query stored KPI data corresponding to the monitored historical KPIs;
  obtaining a forecasted processing volume level based on predicted values determined from a predictive model of the stored KPI data; and
  generating an alert in response to the processing volume level being forecast to exceed a defined threshold.

One or more computer storage media having computer-executable instructions for forecasting processing capacity that, upon execution by a processor, cause the processor to at least:
  monitor historical key performance indicators (KPIs), the KPIs including measured values relating to a number of transactions that can be processed in parallel, an average number of transactions currently being processed, and an average amount of time to process each current transaction;
  receive one or more query parameters to query stored KPI data corresponding to the monitored historical KPIs;
  obtain a forecasted processing volume level based on predicted values determined from a predictive model of the stored KPI data; and
  generate an alert in response to the processing volume level being forecast to exceed a defined threshold.
  extract the query parameters from the plurality of queries;
  input the query parameters into a neural network, wherein the neural network generates an output corresponding to a predicted query; and
  use the output to generate a predicted query and run the predicted query to generate a query result.

Alternatively, or in addition to the examples described above, examples include any combination of the following:
  calculate an estimated maximum capacity value and a forecast future capacity value using the stored KPI data to obtain the forecasted processing volume level.
  display a visualization of the forecasted processing volume level.
  periodically query a transactional database to determine measurements for the KPIs.
  12. display the generated alert and automatically perform a remedial action.
  obtain a forecasted processing volume level based in part on a known scheduled future event or likelihood of a future processing unit failure.
  obtain the forecasted processing volume level using the predictive model to forecast a maximum volume of transactions per second (TPS).

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for generating predicted queries using a neural network. The illustrated one or more processors 604 together with the computer program code stored in memory 614 constitute exemplary processing means for using and/or training neural networks to predict and run queries.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for forecasting processing capacity, the system comprising:
    at least one processor; and
    at least one memory comprising computer program code, the at least one memory and the computer program code configured to, with the at least one processor, cause the at least one processor to:
    monitor historical key performance indicators (KPIs) associated with an application, the KPIs including measured values relating to a number of transactions that can be processed in parallel, an average number of transactions currently being processed, and an average amount of time to process each current transaction;
    calculate an estimated maximum capacity value and a forecast future capacity value using stored KPI data to obtain a forecasted processing volume level based on predicted values determined from a predictive model of the stored KPI data;
    generate an alert in response to the processing volume level being forecast to exceed a defined threshold; and
    in response to the alert, send a modification signal to the application to modify current or future operations of the application.

2. The system of claim 1, wherein the at least one memory and the computer program code are further configured to, with the at least one processor, cause the at least one processor to analyze the forecasted processing volume level to adjust one or more parameters of the predictive model.

3. The system of claim 1, wherein the at least one memory and the computer program code are further configured to, with the at least one processor, cause the at least one processor to display a visualization of the forecasted processing volume level.

4. The system of claim 1, wherein the at least one memory and the computer program code are further configured to, with the at least one processor, cause the at least one processor to periodically query a transactional database to determine measurements for the KPIs.

5. The system of claim 1, wherein the at least one memory and the computer program code are further configured to, with the at least one processor, cause the at least one processor to display the generated alert and automatically perform a remedial action.

6. The system of claim 1, wherein the at least one memory and the computer program code are further configured to, with the at least one processor, cause the at least one processor to obtain the forecasted processing volume level based in part on a known scheduled future event or likelihood of a future processing unit failure.

7. The system of claim 1, wherein the at least one memory and the computer program code are further configured to, with the at least one processor, cause the at least one processor to obtain the forecasted processing volume level using the predictive model to forecast a maximum volume of transactions per second (TPS).

8. A computerized method for forecasting processing capacity, the computerized method comprising:
    monitoring historical key performance indicators (KPIs) associated with an application, the KPIs including measured values relating to a number of transactions that can be processed in parallel, an average number of transactions currently being processed, and an average amount of time to process each current transaction;
    calculating an estimated maximum capacity value and a forecast future capacity value using stored KPI data to obtain a forecasted processing volume level based on predicted values determined from a predictive model of the stored KPI data;
    generating an alert in response to the processing volume level being forecast to exceed a defined threshold; and
    in response to the alert, sending a modification signal to the application to modify current or future operations of the application.

9. The computerized method of claim 8, wherein the application is a real-time processing application.

10. The computerized method of claim 8, further comprising displaying a visualization of the forecasted processing volume level.

11. The computerized method of claim 8, further comprising periodically querying a transactional database to determine measurements for the KPIs.

12. The computerized method of claim 8, further comprising displaying the generated alert and automatically perform a remedial action.

13. The computerized method of claim 8, further comprising obtaining the forecasted processing volume level based in part on a known scheduled future event or likelihood of a future processing unit failure.

14. The computerized method of claim 8, further comprising obtaining the forecasted processing volume level using the predictive model to forecast a maximum volume of transactions per second (TPS).

15. One or more computer storage media having computer-executable instructions for forecasting processing capacity that, upon execution by a processor, cause the processor to at least:
- monitor historical key performance indicators (KPIs) associated with an application, the KPIs including measured values relating to a number of transactions that can be processed in parallel, an average number of transactions currently being processed, and an average amount of time to process each current transaction;
- calculate an estimated maximum capacity value and a forecast future capacity value using stored KPI data to obtain a forecasted processing volume level based on predicted values determined from a predictive model of the stored KPI data;
- generate an alert in response to the processing volume level being forecast to exceed a defined threshold; and
- in response to the alert, send a modification signal to the application to modify current or future operations of the application.

16. The one or more computer storage media of claim 15, having further computer-executable instructions that, upon execution by a processor, cause the processor to at least analyze the forecasted processing volume level to adjust one or more parameters of the predictive model.

17. The one or more computer storage media of claim 15, having further computer-executable instructions that, upon execution by a processor, cause the processor to at least display a visualization of the forecasted processing volume level.

18. The one or more computer storage media of claim 15, having further computer-executable instructions that, upon execution by a processor, cause the processor to at least periodically query a transactional database to determine measurements for the KPIs.

19. The one or more computer storage media of claim 15, having further computer-executable instructions that, upon execution by a processor, cause the processor to at least display the generated alert and automatically perform a remedial action.

20. The one or more computer storage media of claim 15, having further computer-executable instructions that, upon execution by a processor, cause the processor to at least obtain the forecasted processing volume level based in part on a known scheduled future event or likelihood of a future processing unit failure.

* * * * *